United States Patent [19]

Heidler et al.

[11] Patent Number: 4,541,930
[45] Date of Patent: Sep. 17, 1985

[54] INTERCHANGEABLE SCREEN PANELS FOR A TRAVELING WATER SCREEN

[75] Inventors: Lester D. Heidler, Harleyville; Richard D. Styer, Coopersburg; Enos R. Hunsberger, Perkasie, all of Pa.

[73] Assignee: FMC Corporation, Chicago, Ill.

[21] Appl. No.: 482,670

[22] Filed: Apr. 6, 1983

[51] Int. Cl.$^4$ ............................................. B01D 33/32
[52] U.S. Cl. ................................... 210/344; 210/161; 210/232
[58] Field of Search .............. 210/780, 783, 154, 155, 210/160, 161, 232, 339, 344, 400, 401, 495, 499; 137/315, 316; 209/233; 55/483, 492, 502, 511, 524, 525, DIG. 5, DIG. 31

[56] References Cited

U.S. PATENT DOCUMENTS

| | | | |
|---|---|---|---|
| 1,514,673 | 11/1924 | Roddy | 210/160 |
| 1,590,688 | 6/1926 | Honeyman | 210/160 |
| 1,732,649 | 10/1929 | Hobart | 210/160 |
| 1,781,223 | 11/1930 | Gary | 210/160 |
| 1,910,860 | 5/1933 | Sayers | 210/160 |
| 2,804,209 | 8/1957 | Carlton et al. | 210/160 |
| 2,996,189 | 8/1961 | Salterbach | 210/155 |

*Primary Examiner*—Richard V. Fisher
*Assistant Examiner*—Wanda L. Millard
*Attorney, Agent, or Firm*—Richard B. Megley; Douglas W. Rudy; Ronald C. Kamp

[57] ABSTRACT

A traveling water screen is provided with a support frame having a transverse tray for accommodating a conventional screen panel of a specific configuration or alternatively a modified screen panel having an integral pan for positioning over the transverse tray to provide special handling of seasonally varying screened material. A non-abrupt smooth transition at a transition margin between the screen material and the integral pan allows aquatic life forms to flow from the screen into the integral pan when the screen is backwashed without the aquatic material getting lodged between a screen retaining means and the screen.

1 Claim, 6 Drawing Figures

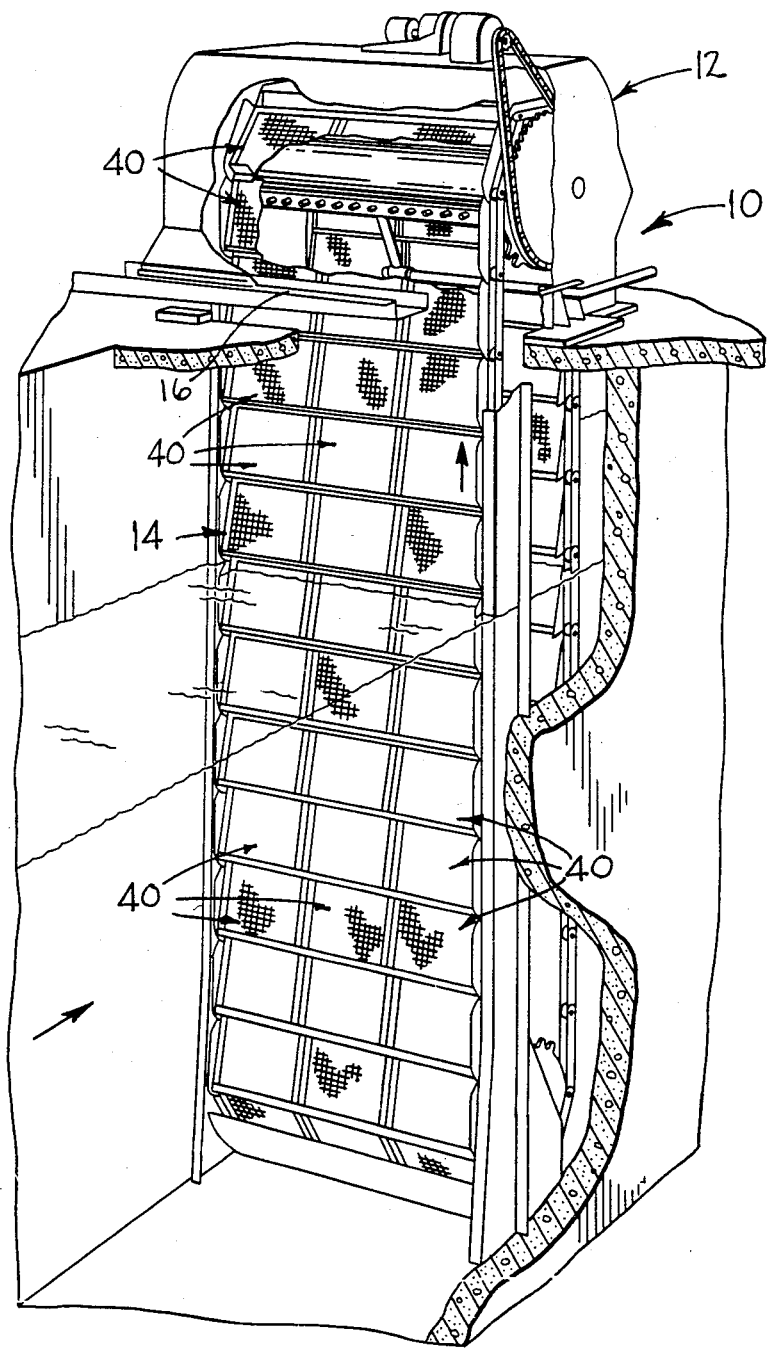
FIG_1

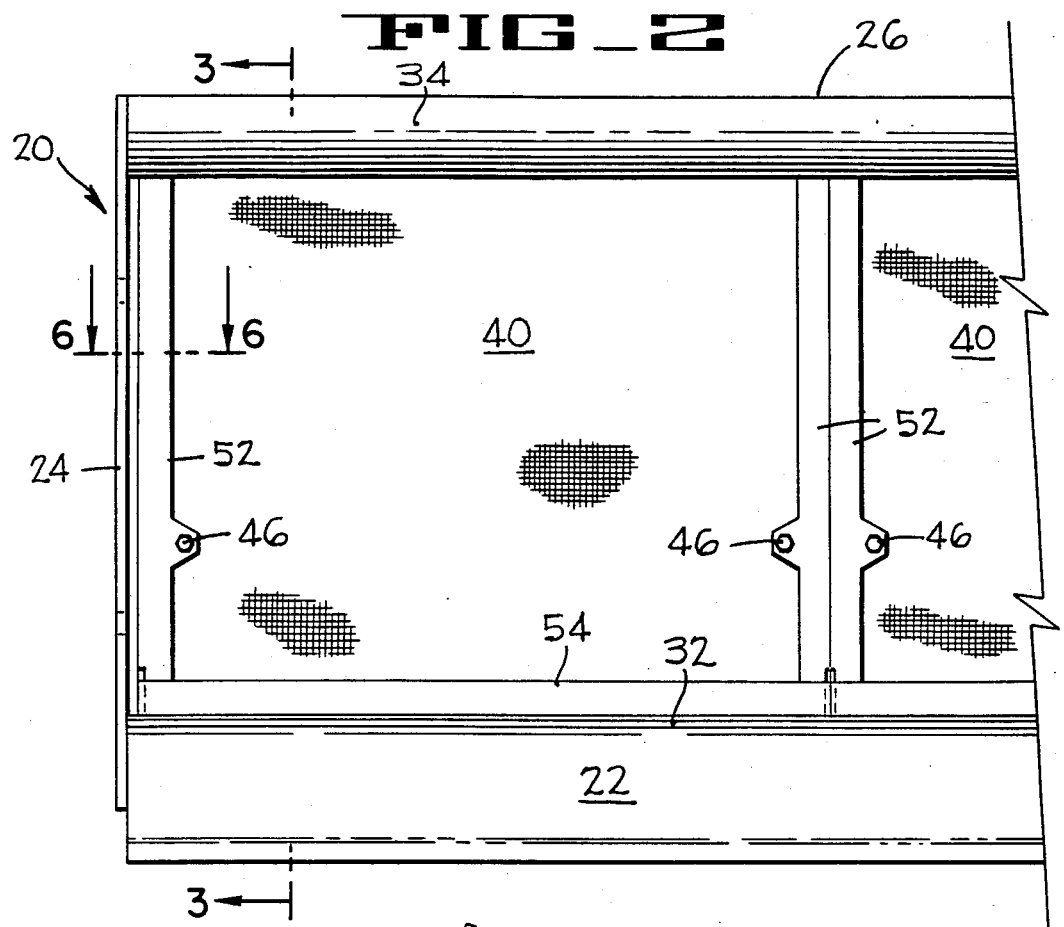
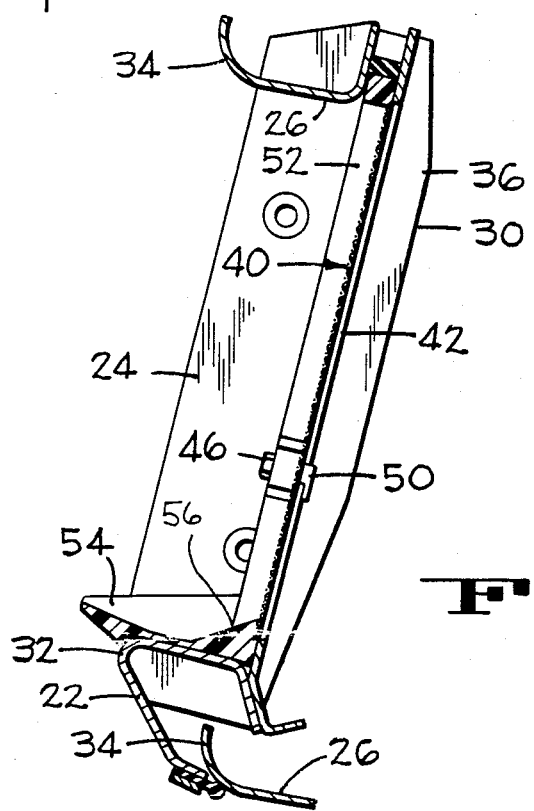

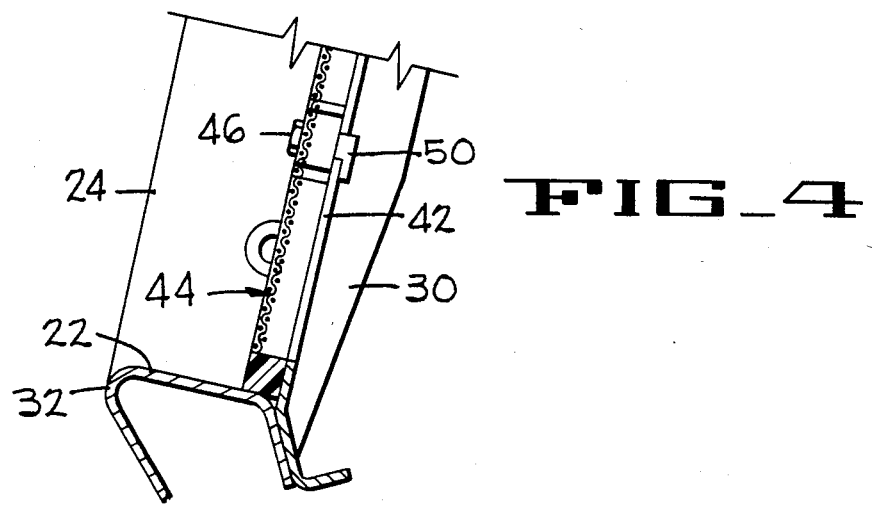
FIG_4
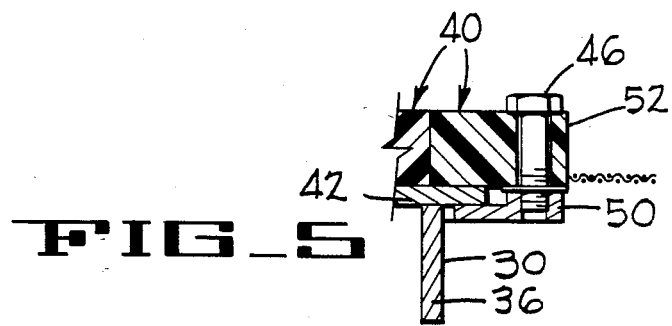
FIG_5
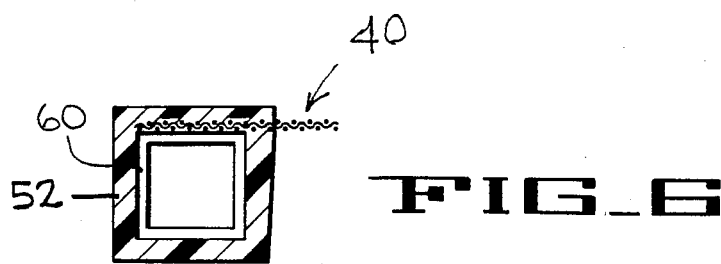
FIG_6

INTERCHANGEABLE SCREEN PANELS FOR A TRAVELING WATER SCREEN

Water screens are used in the water treatment field to strain out debris at the intake of a water treatment facility. One technique of screen utilization is to provide a traveling water screen comprised of numerous individual screens carried on an endless vertical loop of screen supports attached to a driven chain. The lower portion of the loop is immersed in the intake water reservoir while the upper portion of this screen is out of the water. Debris will be accumulated on the screens until flow is restricted to a preset degree whence the verticle loop of screen panels will be driven to bring a clean screen section into the screening position. The restricted screen will be cleaned as it is removed from the water flow.

A normal screen in this application will have a large open mesh screen material however it has been found that seasonable changes of the screens are necessary to protect fish larvae and eggs which should not be taken in to the water treatment facility for ecological reasons. Thus, screens having a finer mesh are used to catch the aquatic life that would normally pass through the large mesh screen.

This invention provides fine mesh screens having an integral pan along the lower edge of the screen panel which can be used to collect fish eggs and larvae as the screen travels out of the water. Interchangeable screen panels are know that have as their object the preservation of aquatic life forms however the instant invention differs from the closest known prior art in that each panel is individually mounted to a tray frame and a larvae pan is integral with the panel and provides a smooth transition between the screen material and the specifically contoured larvae pan.

An interchangeable screen panel is provided having desirable features for the protection of aquatic life forms while also being interchangeable with screen panels of conventional mesh openings.

The invention will be readily understood when the following description is read in conjunction with a perusal of the drawing figures wherein:

FIG. 1 is a perspective view of a traveling water screen.

FIG. 2 is portion of a water screen having a frame and more than one panel installed in the frame.

FIG. 3 is a cross-section through 3—3 of FIG. 2 showing a tray assembly on the ascending side of the verticle loop of a traveling water screen.

FIG. 4 is a view of the frame of FIG. 3 with a conventional large mesh screen installed.

FIG. 5 is a detail of the mounting apparatus of the screen of FIG. 4 in detail.

FIG. 6 is a cross-sectional view of a portion of the screen taken through 6—6 of FIG. 2.

Looking at the overall presentation of a traveling water screen of FIG. 1, it can be seen that the water screen generally 10 includes a drive station generally 12 located above the water level and a continuous loop of rectangular screen panels such as 14 which are carried on long pitch chains and are submerged at a lower portion in the intake flow of water to be screened.

This is one type of traveling water screen that is shown for exemplary purposes. Other types of water screens are known and the invention presented herein can be used with equal facility on these other types of screens.

The screens will ascend on the intake side to the drive station 12 where a directed flow of water will backwash the screen panels and flush debris down the trough 16 for disposal. FIG. 2 presents a portion of a single screen frame having one and a portion of another screen panel generally 20 installed. Each screen has a screen mesh panel supported by a panel frame. A plurality of screens may be provided in place of a single long screen thus allowing replacement of single screens individually. The screen frame which is the support structure for a plurality of screen panels, can best be understood when FIG. 2 is examined in conjunction with FIG. 3. In these Figures 22 is a transverse tray extending continuously from one end 24 of the screen frame to another (not shown). This first tray 22 is formed to provide a ledge that extends from a backup frame 30 forwardly into the direction of the fluid flow. As the outer most termination of the ledge, the tray is directed back toward the backup frame at a downwardly projecting angle to interlock with the following top member 26. The top member 26 projects upwardly at its leading edge 34 to allow such interlocking.

The backup frame 30 includes vertically extending supports 36 to which screen panels generally 40 are attached. Support 36 includes an attaching flange 42 that contacts the screen panels. A plurality of these supports such as 36 are used in each backup frame 30 to support the usual course mesh screen and alternatively the seasonal fine mesh screens.

The usual operating mode is shown in FIG. 4 where a conventional course mesh screen generally 44 is mounted to the backup frame 30 through the use of a clamp comprising of fastener 46 and a clamping tab 50. Fastener 46 passes through an aperture in the screen panel frame 52 (FIG. 5) into the clamping tab which overlaps the backside of the attaching flange 42 to hold the screen in place. This screen attachment means is used for the course mesh screen as well as for the fine mesh screen when the course mesh screen has been removed.

FIG. 3 shows the fine mesh screen with its integral larvae pan 54. The screen uses the same general frame 52 of FIG. 5 for the left, right and top edges of the screen but is different from the course mesh screen shown in FIG. 4 in that the integral larvae pan is incorporated in the screen.

The larvae pan 54 is generally a wide shallow trough as shown in the section view of FIG. 3 that extends along the bottom of each screen panel. As the trough is provided with end barriers, any fluent in the trough is retained. However, in operation the aquatic material that accumulates in the larvae pan is gently and positively flushed from the pan into a return stream of water. In a typical installation, there would be two or more adjacent panels so each panel must be made to fit closely and tightly to its adjacent neighbor.

The larvae pan 54 extends generally outwardly from the screen 40 and past the outermost termination 32 of the ledge of the backup frame 30. The trough 54 meets the screen mesh panel 40 and specifically the screen material thereof at a transition margin 56 that forms a relatively nonabrupt smooth transition from the screen material to the trough means or pan 54. This transition margin allows fish eggs, larvea and other aquatic life forms to flow from the face of the screen into the trough when the screen is backwashed without aquatic material getting entrapped or otherwise hung up between the screen and the trough.

The bottom portion of the pan 54, or underbody means, is contoured to prevent the inclusion of material between the pan and the top of the ledge 32. The underbody means is shaped to follow the contour and be compatible with the transverse tray 22 from the rear portion thereof to the outermost termination 32 of the ledge of the backup frame to minimize disassociation from the adjacent support means as seen in FIG. 3.

As can be seen in FIGS. 3-6 the screen frame means is made of a plastic material that is molded around the screen material, at the peripheral edges of the screen material, such that the screen is molded into the screen frame. A thermoplastic material is used in a preferred embodiment and it has been found that the screen will be held tightly by the frame after molding. The integral molding of the screen fabric to the frame minimizes or eliminates ledges and crevices associated with the other fastening systems. Other materials of like compositions are of course good candidates for use as frame material.

FIG. 6 shows an alternative embodiment of a screen frame. In this embodiment the screen frame 52 incorporates an armature 60 around which the plastic material is formed while the screen material is similarly encapsulated and surrounded by the plastic material. The armature 60 could extend through all sides of the frame or just through the sides, top and bottom individually or in combination as necessary for providing frame stiffness.

Thus it can be seen that there has been provided a water screening screen means having a molded frame that entraps, encapsulates and holds the screen means within a frame and further provides a screen frame with an integral larvae pan at a lower portion of the screen. The embodiment shown although a preferred embodiment is exemplary of the inventors invention and nuances of design, materials and manufacturing methods are contemplated by the inventor as being within the scope of the following claims.

What is claimed is:

1. In a screen panel having frame means, a transverse tray carried on said frame means and fabric means carried by said frame means, the improvement comprising; a trough means intersecting said fabric means at a transitional margin, said transitional margin providing a nonabrupt, smooth transition from said fabric means to said trough means, said trough means further having an underbody means shaped to follow the contour of said transverse tray from a rear portion thereof to an outermost termination of said transverse tray, said underbody means preventing the inclusion of material between said trough means and said transverse tray.

* * * * *